United States Patent [19]

Moore et al.

[11] 3,970,625

[45] July 20, 1976

[54] PRODUCTION OF UREA-FORMALDEHYDE CONCENTRATES

[75] Inventors: William Percy Moore, Hopewell; James Earl Sansing, Chester; Harold Daniel Williamson, Hopewell, all of Va.

[73] Assignee: Allied Chemical Corporation, New York, N.Y.

[22] Filed: Nov. 14, 1974

[21] Appl. No.: 523,622

Related U.S. Application Data

[63] Continuation of Ser. No. 341,192, March 14, 1973, abandoned.

[52] U.S. Cl. ............................. 260/29.4 R; 71/28; 71/30
[51] Int. Cl.² ....................................... C08L 61/24
[58] Field of Search ............ 106/287; 260/29.4, 69, 260/71; 71/28

[56] References Cited

UNITED STATES PATENTS

| | | | |
|---|---|---|---|
| 2,255,027 | 9/1941 | Keenen | 71/30 |
| 2,625,524 | 1/1953 | Kvalnes | 260/69 R |
| 2,652,377 | 9/1953 | Kise | 260/29.4 R |
| 3,092,486 | 6/1963 | Waters | 71/30 |
| 3,629,176 | 12/1971 | Shriver | 260/29.4 |

Primary Examiner—Theodore Morris
Attorney, Agent, or Firm—Fred L. Kelly

[57] ABSTRACT

A process for preparing an improved urea-formaldehyde concentrate particularly adapted for production of slow-release nitrogenous fertilizers. The improvement is achieved by accurately controlling the buffer strength and the degree of polymerization of the urea-formaldehyde concentrate within specified critical limits. The process can be operated to also produce a different urea-formaldehyde concentrate suitable for use in adhesives.

1 Claim, No Drawings

PRODUCTION OF UREA-FORMALDEHYDE CONCENTRATES

This is a continuation of application Ser. No. 341,192 filed Mar. 14, 1973 now abandoned.

BACKGROUND OF THE INVENTION

This invention relates to stable urea-formaldehyde concentrates containing urea and formaldehyde in a mol ratio of 4.0 to 6.5 mols formaldehyde for every mol of urea, and to a process for their production.

The reaction of formaldehyde and urea in alkaline solution followed by evaporation of water to yield concentrated solutions is well known. U.S. Pat. No. 2,652,377 discloses a urea-formaldehyde concentrate product which has met with considerable commercial success. This type of product is sold mainly for making adhesives for plywood or particle board and for making fertilizers containing water-insoluble, slow-release nitrogen. For use in wood adhesives, the concentrate is mixed with sufficient urea to give a formaldehyde to urea mol ratio of about 1.5, an acid catalyst is added, and the mixture is sprayed or rolled onto the wood which is then heated in a press to cure the resin. To prepare slow-release nitrogen fertilizers, the concentrate is mixed with sufficient urea to adjust the formaldehyde to urea mol ratio to about 0.5, an acid catalyst is added, and the mixture is allowed to react to form a ureaform fertilizer, usually with agitation and in the presence of solid fertilizer ingredients such as ammoniated superphosphate, potassium chloride and dolomite. It has been the practice of the industry to supply both of these uses with the same urea-formaldehyde concentrate; however, each type of application has from time to time experienced considerable difficulty with the product. Processing problems involving sticking of the product and plugging of processing equipment have been particularly troublesome in the use of the concentrate in the fertilizer industry. Short pot life has been the major problem in the adhesive industry. Accordingly, considerable research has been carried out to overcome these problems by providing an optimum urea-formaldehyde concentrate for each of these uses, i.e., one type of product for use in fertilizers and another type of product for use in adhesives.

SUMMARY OF THE INVENTION

It is an object of this invention to provide a practical, economic process for the conversion of formaldehyde and urea into a stable liquid product containing 60% or more, preferably 80 to 85%, total solids calculated as formaldehyde and urea and the remainder water, in which this solids content is soluble at atmospheric temperatures.

Another object is to provide a urea-formaldehyde concentrate that is particularly suitable for production of slow-release nitrogenous fertilizers.

Another object is to provide a urea-formaldehyde concentrate that is particularly suitable for production of adhesives.

Still another object is to provide a process for preparing two different types of urea-formaldehyde concentrate, one type being particularly suitable for production of slow-release nitrogenous fertilizers, the other type being particularly suitable for production of adhesives.

In carrying out the process of our invention, a 30 to 50% aqueous formaldehyde solution is one of the starting materials. We preferably use an uninhibited (low methanol) formaldehyde solution containing no more than 0.02% by weight of formic acid based on the formaldehyde. The urea used in the process may be solid urea or an aqueous solution. We prefer to use urea containing no more than 0.015% by weight of ammonia based on the urea.

The process of our invention is essentially an improvement over the process of U.S. Pat. No. 2,652,377, which is directed to production of a stable, aqueous solution of urea-formaldehyde reaction products. Briefly stated, the process of the present invention comprises incorporating an aqueous formaldehyde solution containing from 30 to 50% by weight formaldehyde and preferably no more than 0.02% by weight of formic acid based on the formaldehyde, with urea, preferably containing no more than 0.015% by weight of ammonia, in amount such that the resulting mixture contains a mol ratio of 4.4 to 7.3 mols, preferably 4.6 to 5.9 mols, of formaldehyde for every mol of urea, adjusting the pH of the reaction mixture thus prepared to within the range pH 8.8 to 9.5, preferably 8.8 to 8.9 and thereafter heating said reaction mixture at temperatures in the range 30° to 60°C. for at least 15 minutes, preferably 0.5 to 1.0 hour, and thereafter evaporating water from said mixture by simple distillation at temperatures in the range of about 45° to 60°C. under reduced pressure below atmospheric, at which water is vaporized from the mixture until the liquid residue of the evaporation contains 60 to 90%, preferably 80 to 85%, by weight total solids calculated as formaldehyde and urea, and preferably 4.2 to 5.2 mols of formaldehyde for every mol of urea, the total time of heating the reaction mixture and thereafter of evaporating water therefrom being so correlated with the reaction temperature and the evaporation temperature that the resulting concentrated aqueous urea-formaldehyde reaction product contains 2 to 3 urea-formaldehyde molecular species as determined by chromatographic procedure described hereinafter in Example 1. This product preferably has a buffer capacity of 7 to 10 as determined by the buffer test described hereinafter in Example 2.

In accordance with one preferred embodiment of the present invention, part of the above-described urea-formaldehyde reaction product containing 2 to 3 urea-formaldehyde molecular species is cooled to ambient temperature and the buffer capacity is increased by addition of sufficient ammonia to increase the buffer capacity to 12 to 16 as determined by the buffer test described hereinafter in Example 2. The resulting product is particularly useful in the production of adhesives for plywood or particle board.

In accordance with another preferred embodiment of the present invention, at least part of the above-described urea-formaldehyde reaction product containing 2 to 3 urea-formaldehyde molecular species is maintained at 45° to 60°C. until the number of urea-formaldehyde molecular species in the product is increased to 5 to 6 as determined by the stated chromatography procedure. The resulting product has a low buffer capacity of 7 to 10 as determined by the stated buffer test and is particularly useful for making fertilizers containing slowly available nitrogen.

DESCRIPTION OF THE PREFERRED EMBODIMENT

In order to demonstrate the invention, the following examples are given. They are provided for illustrative purposes only and are not to be construed as limiting the scope of the invention, which is defined by the appended claims.

EXAMPLE 1

This example describes a chromatographic technique which has been found useful to determine the number of urea-formaldehyde molecular species in a urea-formaldehyde concentrate solution.

Two microliters of a 20% aqueous solution of the urea-formaldehyde concentrate are placed on a strip of conventional chromatographic paper (Whatman No. 1) which is placed in position for descending chromatography. The developing solution used is a butanol-ethanol-water solution in a 6:1:2 weight ratio. The chromatogram is developed eighteen hours, then allowed to dry. Spots indicating molecular species are revealed by spraying the paper with Tollen's reagent. Chromatograms may be fixed for permanent record if desired by use of a commercial fixer.

For purposes of this invention, chromatograms having 2 to 3 spots indicate a low degree of polymerization, whereas chromatograms having 4 to 6 spots indicate a moderate degree of polymerization. A high degree of polymerization will show two spots plus a large smear from sample spot to about half way up the chromatograph.

EXAMPLE 2

This example describes a procedure which has been found useful to determine the buffer capacity of a urea-formaldehyde concentrate solution. In this test the sample size of the urea-formaldehyde concentrate is adjusted to be equivalent to 200 grams of 37% formalin. For example, the following determination is carried out with a typical concentrate containing 60% formaldehyde equivalent; thus, same size is 7400/60 or 123 grams.

First, 123 grams of the urea-formaldehyde concentrate is mixed with 77 grams of water, the mixture is titrated to pH 9.0 with 0.5 N sodium hydroxide solution, and the number of milliliters of sodium hydroxide solution required is recorded. Then, a second sample of 123 grams of the urea-formaldehyde is mixed with 77 grams of water, the mixture is titrated to pH 2.0 with 0.5 N sulfuric acid solution, and the number of milliliters of sulfuric acid solution required is recorded. The total buffer capacity of the urea-formaldehyde concentrate equals the total milliliters of acid and base titer required between pH 9 and pH 2.

For purposes of this invention, urea-formaldehyde concentrates having a buffer capacity of 7 to 10 are considered to have a low buffer capacity, whereas concentrates having a buffer capacity of 12 to 16 are considered to have a moderately high buffer capacity.

In accordance with the present invention, we have found that to make improved adhesives a urea-formaldehyde concentrate having a low degree of polymerization and a moderately high buffer capacity is required, whereas to make fertilizers containing slowly available nitrogen with minimum processing problems, a urea-formaldehyde concentrate with a low buffer capacity and a moderate degree of polymerization is needed. The following examples show methods for making and using these two types of urea-formaldehyde concentrate.

EXAMPLE 3

This example illustrates a preferred method of making two different urea-formaldehyde concentrates, one type being suitable for manufacture of adhesives, the other type being suitable for use in fertilizer manufacture.

About 100 parts of a 50% aqueous urea solution containing no more than 0.015% ammonia based on the weight of the urea, is mixed with 240 parts of 50% aqueous formaldehyde solution containing no more than 0.02% formic acid based on the weight of the formaldehyde, and the mixture is adjusted to pH 8.8 with 25% aqueous sodium hydroxide solution. This mixture is reacted for 30 to 60 minutes at 50° to 60°C. After reaction, the mixture is concentrated in a vacuum film evaporator at a temperature of about 55°C. to a solids content of about 85 weight percent in about 10 seconds. The resulting concentrate has a buffer capacity of about 8 as determined by the procedure of Example 2. A chromatograph prepared in accordance with Example 1 shows three spots. For convenience, this concentrate is called Product A. Product A is a clear, aqueous solution of urea-formaldehyde reaction product which is stable for storage periods of at least two months at room temperature.

To make a product suitable for manufacture of adhesives, Product A is immediately cooled to ambient temperature to avoid further polymerization and the buffer content is adjusted to about 13 by adding a small portion of ammonia. For convenience, this concentrate is called Product B.

To make a product suitable for manufacture of fertilizers containing water-insoluble, slow-release nitrogen, Product A is maintained for 48 hours at 45° to 50°C. The resulting concentrate is designated Product C. A chromatograph prepared in accordance with Example 1 shows 5 or 6 spots for Product C. The buffer capacity of Product C is about 8 as determined by the procedure of Example 2.

EXAMPLE 4

About 3,980 grams of 36.3% by weight aqueous formaldehyde solution containing about 1.5% by weight of methanol is added to a 5 liter jacketed flask equipped with a stirrer. This formaldehyde solution preferably contains no more than 0.02% by weight of formic acid based on the formaldehyde. Sufficient aqueous sodium hydroxide solution is added to the formaldehyde solution to adjust the pH to about 8.5. The alkaline aqueous formaldehyde solution is warmed to 30°C. and 540 grams of crystalline urea containing no more than 0.015% by weight of ammonia based on the urea, is added with stirring to provide a mixture wherein the formaldehyde to urea mol ratio is about 5.2. After the urea is dissolved, the pH of the solution is adjusted to about 8.8 to 8.9 with aqueous sodium hydroxide solution. The total amount of sodium hydroxide charged to the reaction solution is 0.003% by weight of the urea charged. The reaction mixture is heated for 1 hour at 60°C., then evaporated at 50 mm of Hg pressure in a tubular film evaporator through which the liquid passes over the heat transfer surfaces in about 10 seconds to evaporate and take off as distillate vapors about 47% by weight of the charge to the evaporator. The temperature of the solution undergoing evaporation is about 50° to 55°C. The product containing 85% solids is cooled to about 30°C. This concentrate which may be called an "intermediate product" has a low degree of polymerization showing three distinct spots when tested in accordance with the chromatographic procedure of Example 1; it also has a low buffer capacity of about 10 when tested in accordance with the procedure of Example 2.

A 200-gram portion of the above-described "intermediate product" is mixed with 0.085 gram of aqueous ammonia containing 30% by weight of ammonia to increase the buffer content of the concentrate. A sample of the resulting product has a buffer capacity of 13.3 when tested in accordance with the procedure of Example 2. Said buffer capacity does not change during storage of the product. This product was found to be particularly suitable for production of adhesives having relatively long pot life.

Another 200-gram portion of the above-described "intermediate product" is heated to 47°C. and maintained at 47°C. for 48 hours to increase the degree of polymerization. A sample of the resulting product has a buffer capacity of about 10 when tested in accordance with the procedure of Example 2 and a moderate degree of polymerization when tested in accordance with the procedure of Example 1, i.e., a chromatogram shows five spots. This product is particularly suitable for use in manufacture of fertilizers containing water-insoluble, slow-release nitrogen.

EXAMPLE 5

This example demonstrates the preparation of a complete fertilizer containing water-insoluble, slow-release nitrogen from Product C of Example 3.

The following materials were fed to an open top, agitated tank equipped with an over-flow line:
  35.5 lbs./hr. pelleted urea (46% N)
  16.2 lbs./hr. urea-ammonia solution (43.1% urea, 30.6% ammonia, 26.3% water)
  23.1 lbs./hr. wet process phosphoric acid (53.2% $P_2O_5$)
  2.3 lbs./hr. sulfuric acid (93% $H_2SO_4$)
  12.0 lbs./hr. water Average conditions in the tank were 6 minutes retention time, pH of 6.0 and temperature of 89°C., with all the heat required to obtain this temperature supplied by the heat of reaction of the acids and base. Essentially all the urea was dissolved in this operation. The solution was conducted by the overflow line to a TVA ammoniator. Into the overflow line were introduced the above-specified urea-formaldehyde concentrate Product C) at a rate of 24.4 lbs./hr. and 93% sulfuric acid at a rate of 0.8 lb./hr. The points of injection were selected to give about 10 seconds mixing time for the urea-formaldehyde concentrate and one second mixing time for the acid before the contents of the line were discharged into the TVA ammoniator. The pH of the mixture as it left the pipe was about 4. The following materials at an average temperature of about 45°C. were also charged to the inlet of the ammoniator:
  13.1 lbs./hr. potassium chloride (58.6% $K_2O$)
  19.3 lbs./hr. ammonium sulfate (20.5% N)
  33.8 lbs./hr. expanded vermiculite
  1.5 lbs./hr. dolomite
  250 lbs./hr. recycled dried material from a subsequent step An average of about 5 minutes was required for material to pass through the TVA ammoniator. At a point just before the material discharged from the ammoniator, aqua ammonia (30% $NH_2$) was added at a rate of 0.9 lb./hr. which resulted in the damp mixture leaving the ammoniator having a pH of 5.9. The mixture was dried to a product temperature of 94°C., cooled, and screened in conventional equipment. About 150 lbs./hr. of fertilizer in the particle size range of through 6 mesh Tyler screen and retained on a 14 mesh Tyler screen was withdrawn as product and the remainder of the dried material recycled to the ammoniator.

Analysis of the product was as follows:
  Total N, percent — 20.3
  Free urea N, percent — 3.7
  Water insoluble N, percent — 5.3
  Activity index — 42
  Total $P_2O_5$, percent — 8.5
  Citrate insoluble $P_2O_5$, percent — 0.0
  Water soluble $P_2O_5$, percent, 7.7
  $K_2O$, percent, 5.0
  $H_2O$, percent, 2.4
  pH, 5.6
  Bulk density, lbs./cu. ft., 35

No sticky conditions were noted during the processing when using the urea-formaldehyde concentrate of the present invention (Product C); sticking of the solids being processed is highly undesirable because it causes frequent plugging of the process equipment.

EXAMPLE 6

This example demonstrates the preparation of an adhesive from Product B of Example 3.

An adhesive was prepared by mixing at room temperature 1500 parts of the above-specified urea formaldehyde concentrate (Product B), 729 parts of urea, 30 parts of melamine, and 200 parts of water, all by weight. The resulting mixture was catalyzed with a solution of 22.5 parts by weight of ammonium sulfate in 44 parts of water. The catalyzed adhesive had a pH of about 4 and a room-temperature pot life of at least about 3 hours, which is highly advantageous.

To prepare a particle board, 110 parts by weight of water was sprayed onto 3700 parts by weight of a pine-mixed hardwood furnish which originally contained 7.6% weight of moisture. Then 427 parts of the above described catalyzed adhesive was sprayed onto the furnish in about 2 minutes to give an 8% by weight resin solid application. The spray furnish had a moisture content of 11.6%. A mat containing 1250 parts of sprayed furnish was formed by hand in a 12 × 15 inches forming box. The mat was transferred to an electrically heated platen press. The platen temperature was 300°F. Sufficient pressure of about 500 p.s.i.g. was applied to close the press to 0.5 inch stops in about 1.5 minutes. Boards were made using total press times of 7 and 9 minutes. These boards had the following properties:

|  | Cure Time | |
| --- | --- | --- |
|  | 7 minutes | 9 minutes |
| Moisture content, percent by weight | 7.8 | 7.8 |
| Air dry density, lbs./ft.$^3$ | 50.9 | 51.3 |
| Modulus of rupture, p.s.i. | 2,760 | 2,950 |
| Modulus of elasticity, ×10$^{-3}$, p.s.i. | 497 | 491 |
| Face screw hold, lbs. | 535 | 608 |

-continued

| | Cure Time | |
|---|---|---|
| | 7 minutes | 9 minutes |
| Impact strength, inch-lbs. | 26 | 27 |

DISCUSSION OF THE INVENTION

In the modern production of solid mixed fertilizers containing ureaform nitrogen, it is desirable to obtain a high production rate of fertilizer (in terms of tons per hour) and at the same time achieve a high conversion rate of the water-soluble nitrogen fed to the process into water-insoluble nitrogen. This dual object has been very difficult to achieve with the present state of the art, and it has been practically impossible to achieve without creating sticky conditions during the process which cause gradual plugging of process equipment. Normally, rather frequent plant shutdowns have been required to clean out the equipment to allow further operation of the fertilizer plant.

In accordance with the present invention, a process has been devised for producing an aqueous urea-formaldehyde concentrate that reacts so effectively with urea in the presence of sulfuric acid and the various ingredients which comprise solid complete fertilizers, that a fertilizer can be produced with efficient conversion of water-soluble urea nitrogen into slow-release or water-insoluble nitrogen at a high production rate without the necessity of shutdown of the plant for cleaning sticky material from the equipment. This improvement is based on the discovery that the buffer capacity and degree of polymerization of the urea-formaldehyde concentrate are both critical and must be accurately controlled to produce product adapted for production of fertilizers. For best results, the buffer capacity should be controlled between 7 and 10 (as defined in Example 2) and the degree of polymerization should be controlled between 5 and 6 urea-formaldehyde molecular species (as defined in Example 1).

We claim:

1. In a process for the production of a stable, aqueous solution of urea-formaldehyde reaction products which comprises incorporating an aqueous formaldehyde solution containing from 30 to 50% by weight formaldehyde and no more than 0.02% by weight of formic acid based on the formaldehyde, with urea containing no more than 0.015% by weight of ammonia, in amount such that the resulting mixture contains a mol ratio of 4.4 to 7.3 mols of formaldehyde for every mol of urea, adjusting the pH of the reaction mixture thus prepared to within the range pH 8.8 to 9.5, thereafter heating said reaction mixture at temperatures in the range 50° to 60°C. for 30 to 60 minutes, and thereafter rapidly evaporating water from said mixture by distillation at temperatures in the range of about 45° to 60°C. under reduced pressure below atmopsheric, at which water is vaporized from the mixture until the liquid residue of the evaporation contains 60 to 90% by weight total solids calculated as formaldehyde and urea, the improvement which comprises:
   a. heat-treating a portion of said liquid residue of the evaporation for about 48 hours at a temperature of 45° to 50°C., thereby producing a urea-formaldehyde concentrate particularly suitable for manufacture of solid complete fertilizers containing water-insoluble, slow-release nitrogen; and
   b. cooling another portion of said liquid residue of the evaporation to ambient temperature and adding sufficient ammonia to said liquid residue to increase the buffer capacity to 12 to 16, thereby producing a urea-formaldehyde concentrate particularly suitable for manufacture of adhesives.

* * * * *